(12) United States Patent
Van Der Schuit

(10) Patent No.: US 9,915,029 B2
(45) Date of Patent: *Mar. 13, 2018

(54) CABLE AND METHOD FOR MONITORING A CABLE

(71) Applicant: Cabin Air Group B.V., Joure (NL)

(72) Inventor: Rinze Jan Van Der Schuit, Oranjewoud (NL)

(73) Assignee: Cabin Air Group B.V., Joure (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/303,120

(22) PCT Filed: May 19, 2015

(86) PCT No.: PCT/NL2015/050359
§ 371 (c)(1),
(2) Date: Oct. 10, 2016

(87) PCT Pub. No.: WO2015/178769
PCT Pub. Date: Nov. 26, 2015

(65) Prior Publication Data
US 2017/0037570 A1    Feb. 9, 2017

(30) Foreign Application Priority Data

May 20, 2014  (NL) .................................. 2012848
May 20, 2014  (NL) .................................. 2012849

(51) Int. Cl.
*D07B 1/14*    (2006.01)
*D07B 1/18*    (2006.01)

(52) U.S. Cl.
CPC ............. *D07B 1/145* (2013.01); *D07B 1/18* (2013.01); *D07B 2201/2096* (2013.01);
(Continued)

(58) Field of Classification Search
CPC .................................. B66C 1/12; D07B 7/165
See application file for complete search history.

(56) References Cited

U.S. PATENT DOCUMENTS 2,598,829 A * 6/1952 Pollard .................... F16G 9/00
                                                          57/201
3,056,706 A * 10/1962 Knoppel ................. B29C 70/20
                                                          156/169

(Continued)

FOREIGN PATENT DOCUMENTS

DE    3616465 C1    5/1987
DE    3924379 A1    1/1991
(Continued)

*Primary Examiner* — Shaun R Hurley
(74) *Attorney, Agent, or Firm* — Rogowski Law LLC

(57) ABSTRACT

A cable 1 comprises a first thimble 2 and a second thimble 4, at least one yarn 6, and at least a first conductive fiber 8 for monitoring the cable 1. The yarn 6 extends from the first thimble 2 to the second thimble 4, turns around the second thimble 4, extends from the second thimble 4 to the first thimble 2, and turns around the first thimble 2. Each thimble holds a stack 9 of layers 10 of turns of the yarn 6. The first conductive fiber 8 is designed to signal the wear of the yarn 6 by breaking after a predetermined portion of the turns of the yarn 6 breaks. The first conductive fiber 8 is positioned at the first thimble 2 between the turns of the yarn 6 at less than 50% of the stack height h.

16 Claims, 2 Drawing Sheets

(52) U.S. Cl.
CPC .. *D07B 2205/201* (2013.01); *D07B 2205/205* (2013.01); *D07B 2205/2014* (2013.01); *D07B 2205/2042* (2013.01); *D07B 2205/2046* (2013.01); *D07B 2205/2096* (2013.01); *D07B 2205/3007* (2013.01); *D07B 2301/5504* (2013.01); *D07B 2301/5577* (2013.01); *D07B 2501/203* (2013.01); *D07B 2501/2015* (2013.01); *D07B 2501/2061* (2013.01); *Y02B 10/30* (2013.01)

(56) References Cited

U.S. PATENT DOCUMENTS

| | | | | |
|---|---|---|---|---|
| 3,222,858 | A | * | 12/1965 | Gilmore .................. D07B 1/18 57/201 |
| 4,354,704 | A | * | 10/1982 | Mayerjak ................ B66C 1/12 294/74 |
| 4,569,190 | A | * | 2/1986 | Gilmore .................. B60R 22/22 297/468 |
| 5,015,859 | A | | 5/1991 | Uejio |
| 6,289,742 | B1 | * | 9/2001 | De Angelis ............... B66B 7/06 73/158 |
| 2008/0061572 | A1 | * | 3/2008 | Harada .................... B66C 1/12 294/74 |
| 2008/0148704 | A1 | | 6/2008 | Angelis |
| 2009/0078922 | A1 | * | 3/2009 | Kempf .................. D07B 1/025 254/266 |
| 2011/0089130 | A1 | * | 4/2011 | Stephan .................... B66C 1/12 212/262 |
| 2011/0272956 | A1 | | 11/2011 | Bae |
| 2017/0037570 | A1 | * | 2/2017 | Van Der Schuit ..... D07B 1/145 |

FOREIGN PATENT DOCUMENTS

| | | |
|---|---|---|
| DE | 102008026731 A1 | 12/2009 |
| DE | 202010013519 U1 | 11/2010 |
| JP | 2000177977 A | 6/2000 |
| WO | 2005075286 A1 | 8/2005 |
| WO | 2006/049226 A1 | 5/2006 |
| WO | 2011/004071 A2 | 1/2011 |

\* cited by examiner

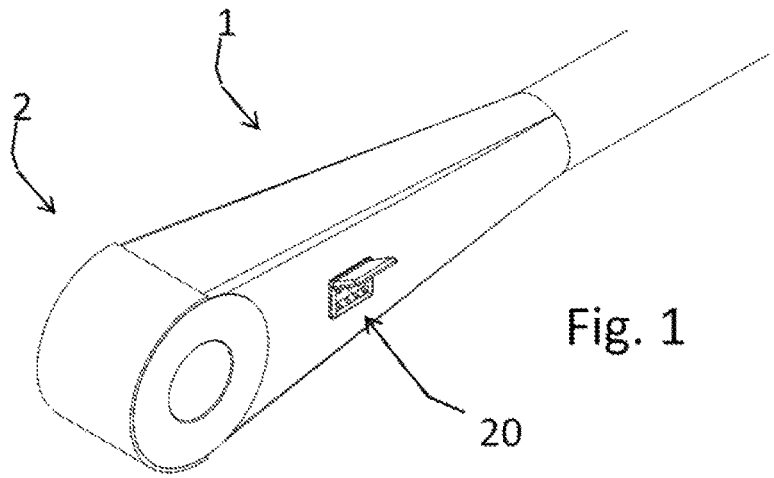
Fig. 1
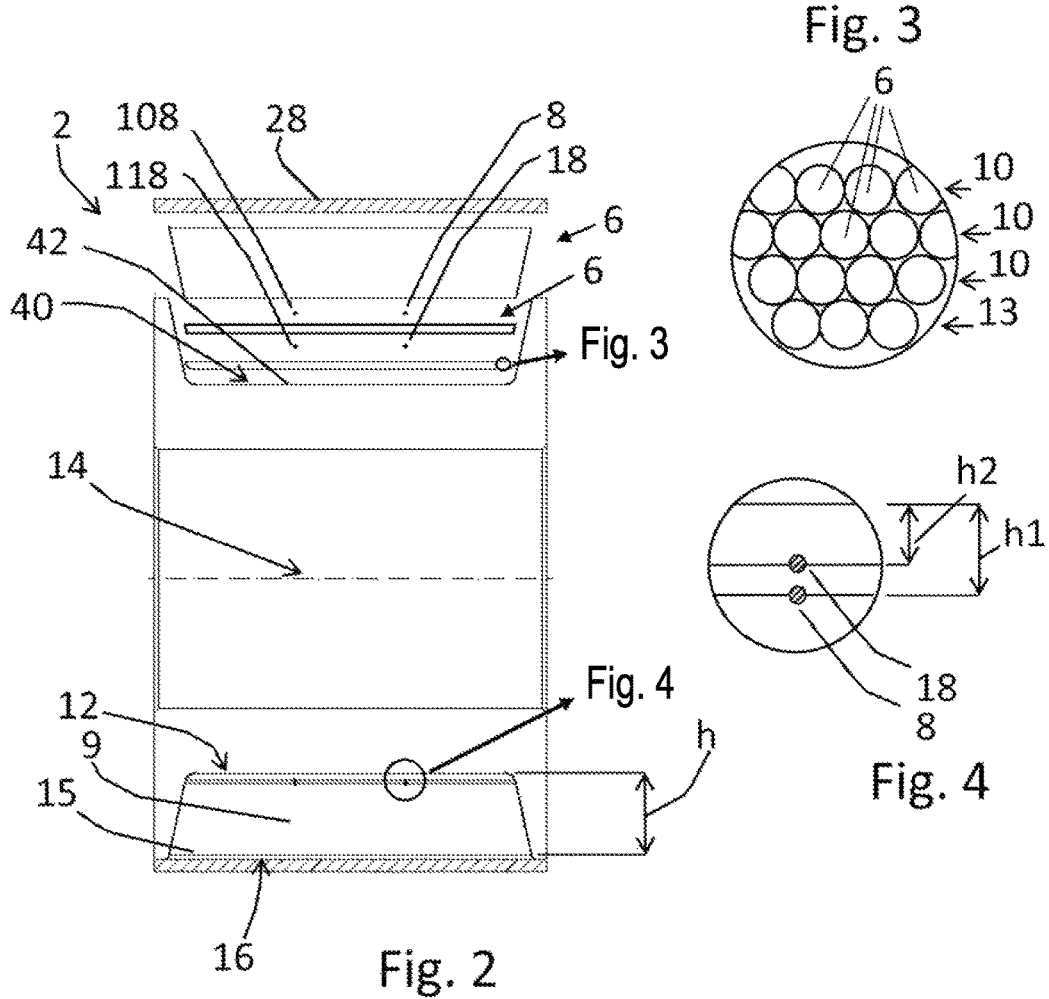
Fig. 2
Fig. 3
Fig. 4

CABLE AND METHOD FOR MONITORING A CABLE

CROSS-REFERENCE TO RELATED APPLICATIONS

This application is a national stage application (under 35 USC § 371) of PCT/NL2015/050359, filed May 19, 2015, which claims benefit of Netherlands application Nos. 2012848 and 2012849, filed May 20, 2014, the contents of each of which are incorporated by reference herein.

BACKGROUND OF THE INVENTION

Technical Field and State of the Art

The invention relates to a cable comprising a first thimble and a second thimble, at least one yarn, and at least a first conductive fibre for monitoring the cable. The first and the second thimble are provided at opposite ends of the cable. The at least one yarn extends from the first thimble to the second thimble, turns around the second thimble, extends from the second thimble to the first thimble, and turns around the first thimble, such that the at least one yarn forms a turn around the first and second thimbles. Each thimble holds a stack of layers of turns of the at least one yarn.

A cable of this type can be used in different types of industry, including but not limited to offshore, mining and heavy lifting and construction. In offshore, a cable of this type may be used as a mooring line for ships and structures like a floating oil exploration or production facility, or for a floating wind turbine. In mining and heavy lifting such a cable may be used as a pendant for a crane. In construction such a cable may be used as a tension member in a bridge or as a suspension cable of a roof.

A cable of this type is known from WO-A1-2005/075286, which discloses a cable that is used as a stay for sailing vessels. The stay comprises plastic load bearing fibres, and an optical fibre which in one embodiment can be positioned between the plastic fibres. The plastic fibres and the optical fibre extend between a first and a second thimble and turn around these thimbles forming a stack of fibres. The exact position of the optical fibre relative to the plastic fibres is not described. A figure with a cross section of a cable of this embodiment shows that the optical fibre is positioned in the outer half of the respective strand of plastic fibres. This results in the optical fibre being in the upper half of the stack of fibres in the thimbles.

A measuring device of WO-A1-2005/075286 comprises the stay and a laser, which provides a light pulse at one end of the optical fibre. The light pulse is reflected at the second end. The travelling time of the light pulse is measured and the length of the cable is calculated from this. When the cable stretches, the optical fibre elongates, which can be derived from the prolonged travelling time of the light pulse. In order to measure a local deformation of the optical fibre, and thus of the stay in that area, a Bragg Grating is provided on the optical fibre.

Another cable of this type is known from DE-39.24.379 (DE'379). This cable comprises two bundles of load bearing yarns that extend between two thimbles and are joint in a middle part to form the cable, and a signal line that transfers a release signal, e.g. in case of overload or other situations. DE'379 does not disclose other purposes for the signal line. The signal line is positioned in the middle of the cable, seen in cross section, i.e. between both bundles of the load bearing yarns, between the first and second thimbles. The signal line leaves the load bearing yarns at the point where the two bundles split up to wrap around the thimbles, and then exits the cable through the housing of the thimble or the thimble itself. As a result, the signal line is not present in the stack of layers of the first thimble between the turns of the yarn.

A disadvantage of the known cable from WO-A1-2005/075286 is that the related measuring device is expensive and that it does not provide a reliable prediction of the remaining life span of the cable.

The invention aims to solve at least part of these problems, or at least to provide an alternative. In particular, the invention aims to provide a cable that can be used in combination with a simple detection device and enables a reliable prediction of the remaining life span.

SUMMARY OF THE INVENTION

A cable comprises a first thimble and a second thimble, at least one yarn, and at least a first conductive fibre for monitoring the cable. The first and the second thimble are provided at opposite ends of the cable. The at least one yarn extends from the first thimble to the second thimble, turns around the second thimble, extends from the second thimble to the first thimble, and turns around the first thimble, such that the at least one yarn forms a turn around the first and second thimbles. Within the context of this document, a turn of a yarn may be either a semi-continuous loop, or a continuous loop. The term semi-continuous loop refers to the fact that the yarn has a finite length with distinct ends, while in a continuous loop a yarn has no ends. So in a semi-continuous loop, the at least one yarn is wound around the first and second thimble a plurality of times, forming a plurality of loops around these thimbles, which is not completely continuous as the ends of the yarn are not connected to each other. Each thimble holds a stack of layers of turns of the at least one yarn. An inside of the stack is defined as a side of a first layer of turns of the at least one yarn being closest to a centre of the respective thimble. An outside of the stack is defined as a side of a last layer of turns of the at least one yarn being farthest away of the centre of the respective thimble. A stack height is defined as a distance from the inside of the stack to the outside of the stack. The first conductive fibre is designed to signal the wear of the yarn turns by breaking when a predetermined portion of turns of the at least one yarn breaks. The first conductive fibre is positioned at the first thimble between the turns of the at least one yarn at a first predetermined height of the stack measured from the inside of the stack, and the first predetermined height is less than 50% of the stack height.

The invention is based on the insight that cables of this type that are subject to a large number of load cycles fail after a prolonged period, because the varying cyclic loads result in a small movement of the first layer of yarn turns along the bearing surface of the thimble. Repeating this movement a large number of times results in wearing and breaking of the yarns of this lower layer. After they have broken, the next layer of yarns starts wearing, until so many layers have worn that the remaining layers cannot take the full load which is applied on the cable anymore, and the cable fails completely. Once the yarn turns close to the conductive fibre wear and break, the conductive fibre itself will break too. By locating the conductive fibre at a predetermined height in the stack, and by measuring whether the conductive fibre is still conductive over its full length, a user can derive that a certain part of the yarns have broken. If the relevant material properties, such as the resistance against wear, of the yarns and the conductive fibre are the same, they will break approximately at the same time. Accordingly, the conductive fibre breaks when approximately all layers of yarns below the conductive fibre have broken. If the relevant material properties differ, i.e. either the yarns of the conductive fibre wears quicker than the other one, the breaking will not be at the same time, but it will be possible to determine what portion of the yarn turns have broken when the conductive fibre breaks, based on the known difference between the relevant material properties, and/or based on wear tests. The exact predetermined height of the conductive fibre will be determined on the basis of these differences and of the desired safety margin of the cable, i.e. the difference between the advertised break load and the actual break load of a new cable. When the conductive fibre breaks, and as a result is not conductive anymore, the user knows that a certain amount of the load of the cable is gone and that the actual break load of the cable is close to the advertised break load and that the cable should be replaced immediately, or within a known period of time. By positioning the conductive fibre at a predetermined height which is less than 50% of the stack height, the conductive fibre is within the lower half of the yarns, and at least 50% of the yarns is still intact when the conductive fibre breaks. As a result, a cable according to the invention provides a much more reliable indication of the residual strength, and thus the wear, than the cable of WO-A1-2005/075286 of which just the elongation could be measured.

It is noted that WO-2006/049226-A1 discloses a round sling comprising a strand and an annular protective bag. The strand is constituted by a process in which a plurality of high-strength fiber filaments such as PBO fiber are loosely twisted and then circulated by a plural number of laps into an annular shape. Such circulated rows of the strand are arranged in parallel in a plural number of rows. A plurality of rows of the strand are circularly disposed side by side without being bound to each other. An annulus constituted by such a strand is contained in a hollow annular protective bag which is freely movable and stretchable separately from the strand. The round sling has a plurality of detection wires comprising urethane-covered copper wires which are disposed along the annulus of the strand. The outer circumference of a detection wire is covered with a sheath comprising a braided rope. The sheath comprising the braided rope is obtained by knitting and weaving spirally fiber filaments across each other so as to form a cylinder as a whole. Inside the sheath, a reinforcing core wire is disposed along the detection wire to reinforce the detection wire and the sheath. The detection wire is required to exhibit more elongation than the strand. The detection wires are disposed over almost the whole circumference of the strand, and further the opposite ends of the detection wires protrude from the inside to the outside of the strand. The protruded ends of the detection wires are connected to detection terminals. The degree of the damage to the strand inside the round sling can be evaluated by measuring an electrical resistance between detection terminals every definite use period of time.

A round sling such as disclosed in WO-2006/049226-A1 does not have thimbles holding a stack of layers of turns of the strand. Accordingly, none of the detection wires of WO-2006/049226-A1 is positioned in the stack of layers of a thimble between the turns of the strand. Moreover, it is not possible to define a height of this non-present stack, nor to determine at what height a specific detection wire is located.

In a particular embodiment of the invention, the predetermined height is less than 40%, more in particular less than 30%, even more in particular less than 20% of the stack height. A lower predetermined height results in a cable which requires less yarn turns for the same design load, as the conductive fibre will enable an earlier warning that a corresponding portion of the yarns have broken.

In an embodiment, the cable comprises a plurality of yarns. In particular, all yarns form a plurality of turns around the first and second thimble. Producing a cable using a plurality of yarns at the same time results in a shorter production time.

The cable comprises a plurality of conductive fibres. The plurality of conductive fibres includes the first conductive fibre, and is defined as a total number of conductive fibres of two or more than two. By using a plurality of conductive fibres, a more detailed and/or reliable insight in the residual strength and life expectancy of the cable is obtainable.

At least two of the plurality of conductive fibres are positioned at the first thimble between the turns of the at least one yarn at the first predetermined height, spaced apart from each other in a width direction of the first thimble. This enables a more reliable monitoring of the cable in cases of unequal loads on one of the thimbles which may result in a quicker wear of the at least one yarn at one side, in width direction, of the respective thimble than at the other side.

In particular, a part of the plurality of conductive fibres is positioned at the first thimble between the turns of the at least one yarn at one or more further predetermined heights of the stack, wherein the further predetermined heights of the stack are different from the first predetermined height of the stack. Positioning conductive fibres at different heights enables obtaining a more detailed insight in the residual strength and life expectancy of the cable, as breaking of each of the conductive fibres corresponds to a certain amount of wear of the yarn turns.

More in particular, the cable comprises a second conductive fibre provided at the first thimble between the turns of the at least one yarn at a second predetermined height of the stack, and the second predetermined height of the stack is less than the first predetermined height of the stack. The second conductive fibre at a lower predetermined height enables a pre-warning of the wear of the cable. While the wear is not so much, that the cable needs to be replaced, the second conductive fibre will break when the cable is used and wears, which enables the user to observe that wear to a predetermined level has occurred and that actions, such as ordering a new cable, could or should be performed.

In an embodiment, the first conductive fibre extends at least from the first thimble to the second thimble, and is positioned at the second thimble between the turns of the at least one yarn at approximately the same first predetermined height of the stack measured from the inside of the stack as at the first thimble. This embodiment provides a simple solution for measuring the wear at both thimbles with just one conductive fibre. The wear at one thimble might be greater than that at the other thimble. The conductive fibre will break at the thimble where the wear is greatest, enabling a warning signal to the user. For the user it is not important to know where the wear occurs, but much more important to know that there is wear at one or more of the critical points at one of the thimbles.

In an embodiment, the cable comprises a casing, wherein both ends of the first and/or optional plurality of conductive fibres are located. This enables a sturdy and user-friendly solution.

In an embodiment, the first and/or optional plurality of conductive fibres are optical fibres. Preferably, the optical fibre is a glass fibre or a light conducting plastic fibre. An optical fibre has the advantage that it stops being conductive to light when it breaks, regardless of the positioning of the broken ends and/or the rest of the optical fibre.

Preferably a light source, in particular a laser light, is continuously operatively connected to one of the ends of the first optical fibre. By connecting a light source, a permanent detection of wear is possible.

In particular, the light source is provided in the casing. This provides a sturdy solution.

In an embodiment, the cable comprises a cable cover which extends around the cable from the first thimble to the second thimble, and bundles all turns of the at least one yarn extending between the first and the second thimble in one compact bundle in a middle section of the cable. This results in a compact cable.

In particular, the casing is located between the middle section of the cable and one of the thimbles. There is void space between the middle section of the cable and the thimbles. By using this space to position the casing, a compact and sturdy solution is achieved.

In an embodiment, the at least one yarn comprises fibres, in particular carbon fibres, or plastic fibres, more in particular polyamide fibres, polyester fibres, polypropylene fibres, polyethylene fibres, aramid fibres, HMPE fibres, LCAP fibres, or PBO fibres. Each of these types of fibres has its own properties, which makes them suitable for specific uses of the cable.

A method for monitoring a cable according to the invention, comprises the steps of measuring whether the first conductive fibre is still conductive,
  if the first conductive fibre is conductive repeating the measuring after a predetermined amount of time, and
  if the first conductive fibre is not conductive anymore, stop using the cable within a replacement period, in particular stop using the cable immediately.

A user who observes that the conductive fibre is still conductive is assured that at least a predetermined portion of the yarn turns is still intact. When the conductive fibre is not conductive anymore, this implies that the predetermined portion of yarn turns has broken. As a result, the cable is almost or already not safe to use anymore and needs to be replaced soon. Depending on the height of the conductive fibre within the stack and the related wear of yarns, the breaking of the conductive fibre could imply that the user should stop using the cable immediately.

In an embodiment, the cable comprises a second conductive fibre provided at the first thimble between the turns of the at least one yarn at a second predetermined height of the stack, and the second predetermined height of the stack is less than the first predetermined height of the stack, and the method further comprises the steps of
  measuring whether the second conductive fibre is still conductive,
  if the second conductive fibre is conductive repeating the measuring after a predetermined amount of time, and
  if the second conductive fibre is not conductive anymore, preparing to replace the cable in the future.

This embodiment of the method provides a pre-warning of the wear of the cable. An action of preparing to replace the cable could be to place an order with a supplier of cables or the user's warehouse for a new cable.

In an embodiment, the first and/or optional second conductive fibre is an optical fibre, and the step of measuring whether the first and/or optional second conductive fibre is still conductive is performed by emitting light, preferably laser light, at one end of the first and/or optional second conductive fibre, and observing whether light is exiting the other end of the first and/or optional second conductive fibre.

An optical fibre is a reliable type of conductive fibre for this purpose, while a laser light is a very affordable means to measure.

In another aspect of the invention, a cable comprises a first thimble and a second thimble, and at least one yarn. The first thimble and the second thimble are provided at opposite ends of the cable. The at least one yarn extends from the first thimble to the second thimble, turns around the second thimble, extends from the second thimble to the first thimble, and turns around the first thimble, such that the at least one yarn forms a turn around the first and second thimbles. Each thimble comprises a bearing surface, and holds a stack of layers of turns of the at least one yarn. A first layer of turns of the at least one yarn lies on the bearing surface of the respective thimble. The bearing surface of at least one of the thimbles is provided with a friction reducing coating.

Within the context of this document, a thimble is defined as a ring of any shape and made of any material around which the at least one yarn is turned. Within the context of this document, a friction reducing coating is a coating that provides the bearing surface with a friction coefficient between the bearing surface and the yarns that is lower than the friction coefficient between a bearing surface of manually polished stainless steel with a surface roughness of RA of 0.3 µm and the same yarns.

The invention is based on the insight that cables of this type that are subject to a large number of load cycles fail after a prolonged period, because the varying cyclic loads result in a small movement of the first layer of yarn turns along the bearing surface of the thimble. Repetition of this movement a large number of times results in wearing and breaking of the yarns of this lower layer. After they have broken, the next layer of yarns starts wearing, until so many layers have worn that the remaining layers can no longer take the full load applied on the cable, and the cable fails completely. By applying a friction reducing coating on the bearing surface of the thimble, this wear is reduced, so that it takes longer before the yarns start breaking.

In an embodiment, the friction reducing coating comprises a fluoropolymer. Such a friction reducing coating has a low friction coefficient.

In particular, the friction reducing coating comprises polytetrafluoroethylene. This material, as well as some related friction reducing materials, are sold under the DuPont owned trade mark Teflon®.

In an embodiment, the bearing surfaces of both thimbles are provided with the friction reducing coating.

In an embodiment, the thimble provided with the friction reducing coating is a metal thimble, in particular a steel thimble. A metal thimble has good mechanical properties.

In particular, the bearing surface is pre-treated by abrasive blasting before applying the coating. This results in a better adhesion of the coating to the thimble.

In particular, the bearing surface is pre-treated by polishing before applying the coating. More in particular, the bearing surface is manually polished. Such a polished surface further decreases the wear of the yarns.

In an embodiment, the bearing surface has a surface roughness $R_A$ before applying the coating in the range of 0.1-3.0 µm. A surface roughness in this range provides both lower wear of the yarns, and an improved adhesion of the coating to the thimble.

In particular, the bearing surface has a surface roughness $R_A$ before applying the coating in the range of 0.24-0.36 µm, more in particular 0.27-0.33 µm. A surface roughness in this range results in a lower wear of the yarns.

In a variant, the bearing surface has a surface roughness $R_A$ before applying the coating in the range of 1.6-2.4 µm, in particular 1.8-2.2 µm. A surface roughness in this range provides an improved adhesion of the coating to the thimble.

In an embodiment, a cable with a friction reducing coating on the bearing of one or two of its thimbles has any one or more of the preferred features defined above in relation to the cable with the conductive fibre, with none, one or a plurality of conductive fibres.

DESCRIPTION OF THE DRAWINGS

The invention, its effects, and advantages will be explained in more detail on the basis of the schematic drawings, in which:

FIG. 1 shows an end of a cable according to the invention;
FIG. 2 shows a cross section through a thimble of the cable of FIG. 1;
FIG. 3 shows a detail from FIG. 2;
FIG. 4 shows another detail from FIG. 2.

DETAILED DESCRIPTION

Figure 5:
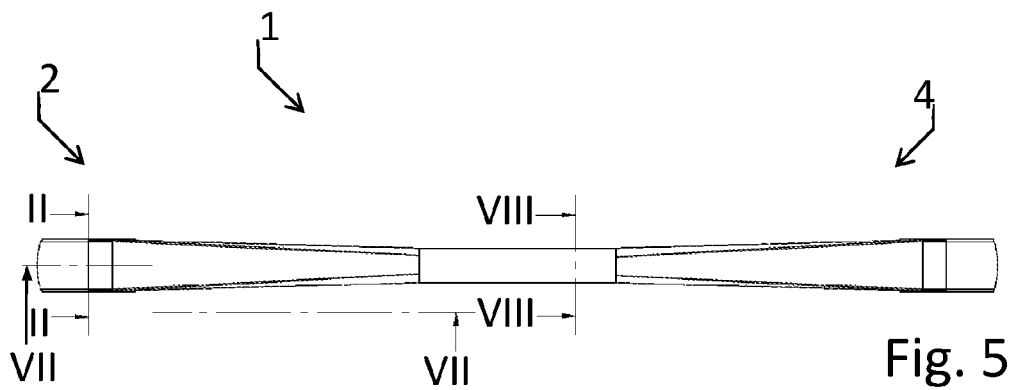
FIG. 5 shows a top view of the cable of FIG. 1.

The figures show a cable according to the invention, which is denoted in its entirety by reference number 1. The cable 1 has a first thimble 2 and a second thimble 4, a plurality of yarns 6, and a plurality of conductive fibres, in this embodiment four optical fibres 8, 18, 108, 118 for signalling wear of the cable 1. The first 2 and the second 4 thimble are made of stainless steel, and are provided at opposite ends of the cable 1. The plurality of yarns 6 are in this embodiment ten yarns 6 which all extend from the first to the second thimble, turn around the second thimble 4, extend from the second thimble 4 to the first thimble 2, and turn around the first thimble 2. In this manner each of the plurality of yarns 6 forms a semi-continuous loop around the first and second thimbles. This loop is repeated a plurality of times, in this embodiment 950 times. So each of the yarns 6 makes 950 turns, resulting in a total of 9500 turns of yarns 6. The yarns 6 consist of fibres, in this embodiment aramid fibres of 3220 dTex that are provided with a marine coating. This coating makes the fibres smoother which results in less fibre to fibre wear. These yarns are sold under the name Twaron® D2204 by Teijin Aramid.

FIG. 2 shows that the thimble 2 holds a stack 9 with a plurality of layers 10 of yarn turns 6. This is shown in more detail in FIG. 3. The second thimble 4 holds layers of the same yarn turns 6 in the same manner and is thus not shown in detail.

An inside of the stack 12 is defined as a side of a first layer 13 of yarn turns 6 being closest to a centre 14 of the thimble 2. An outside of the stack 16 is defined as a side of a last layer 15 of yarn turns 6 being farthest away from the centre 14 of the thimble 2. A stack height h is defined as the distance from the inside of the stack 12 to the outside of the stack 16.

The first, second, third and fourth optical fibres 8, 18, 108, 118 are designed to signal the wear of the yarn turns 6 by breaking when a predetermined portion of the yarn turns 6 break. The first and third optical fibre 8, 108 are positioned at the first thimble 2, i.e. in the stack 9 of layers 10 of the first thimble 2, between the yarns 6 at a first predetermined height h1 of the stack 9 measured from the inside of the stack 12 spaced apart in the width direction of the first thimble 2, in case there is an unequal load and resulting unequal wear of the yarn turns 6. The first predetermined height h1 is in this embodiment 15% of the stack height h. The first and third optical fibres 8, 108 perform the same function in this embodiment, in that they both signal when such a portion of yarn turns 6 have broken that the cable 1 should be replaced. Due to unequal loading, it could be that the yarn turns 6 at one side of the thimble 2 wear more quickly than at the other side. Accordingly it is advantageous to have two optical fibres 8, 108 at the same height h1, but at opposite sides of the thimble 2. If the yarn turns 6 at one side break earlier than at the other side, this will result in breaking of the first or third optical fibre 8, 108 which is at the side where more yarn turns 6 have broken.

The cable 1 has a second and fourth optical fibre 18, 118, which are provided at the first thimble 2 between the yarn turns 6 at a second predetermined height h2 of the stack 9. The second predetermined height h2 of the stack 9 is less than the first predetermined height h1 of the stack 9, in this case 5% of the stack height h. The second and fourth optical fibre 18, 118 perform the same function, in that they both provide an early warning about the wear of the yarn turns 6. There are two optical fibres 18, 118 in this embodiment at the second predetermined height h2 of the stack 9, spaced apart in the width direction of the first thimble 2, in case there is an unequal load and resulting unequal wear of the yarn turns 6.

Figure 6:
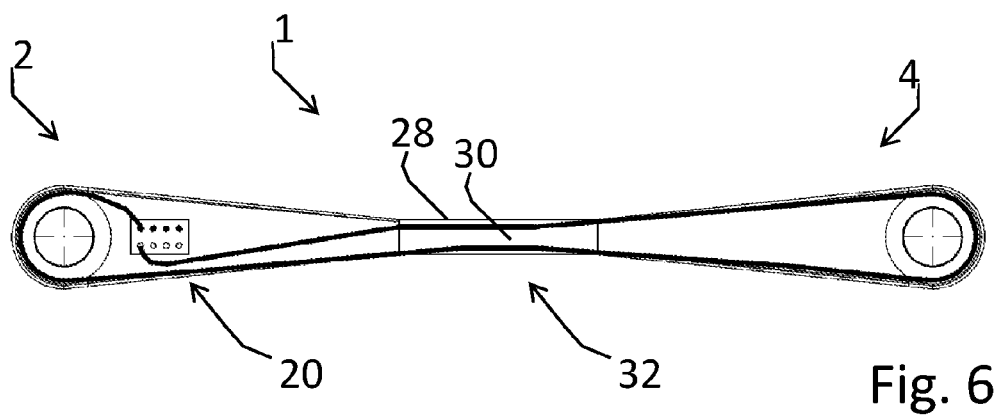
FIG. 6 shows a plan view of the cable of FIG. 1.

FIGS. 5 and 6 show that in this embodiment, the first optical fibre 8 extends from the first thimble 2 to the second thimble 4, and is positioned at the second thimble 4 between the yarn turns 6 at the same first predetermined height h1 of the stack 9 measured from the inside of the stack as at the first thimble 2.

Figure 7:
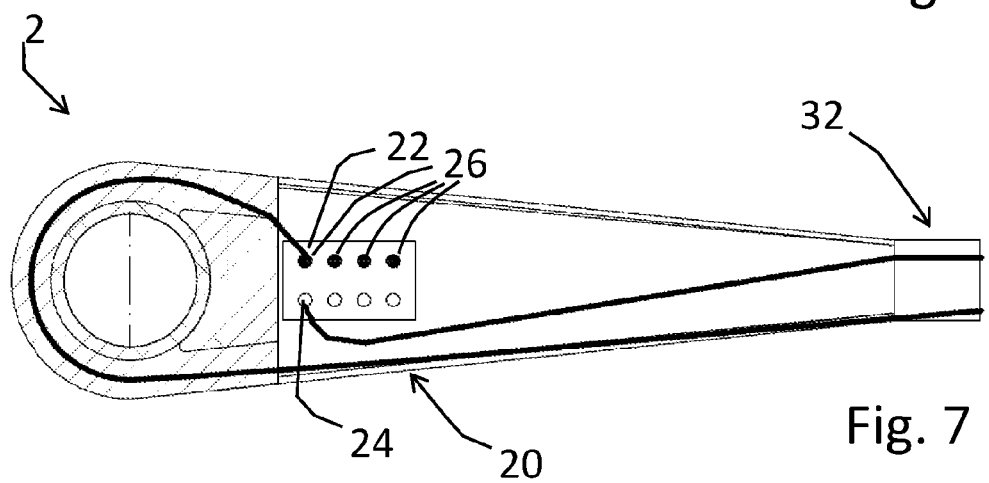
FIG. 7 shows section VII-VII from FIG. 5.
Figure 8:
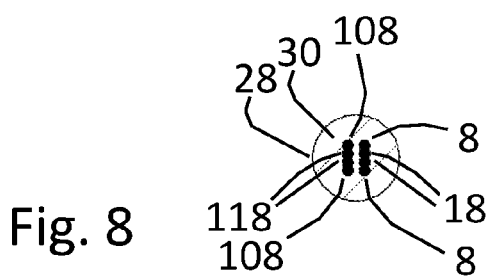
FIG. 8 shows section VIII-VIII from FIG. 5.

FIGS. 1, 6, and 7 show a casing 20. Both ends 22, 24 of the first optical fibre 8 are located in the casing 20.

In this embodiment, the above description relating to the presence of the first optical fibre 8 at the second thimble 4, and the position of the ends in the casing 20 applies to the second, third, and fourth optical fibres 18, 108, 118 too, and is not shown in FIGS. 5, 6 and 7 for the sake of clarity.

A light source, in this embodiment a laser light 26, is provided in the casing 20 and is operatively connected to the first end 22 of the first optical fibre 8. Further laser lights 26 are connected to the first ends of the second, third, and fourth optical fibre (not shown in FIG. 7).

A cable cover 28 extends around the cable 1 from the first thimble 2 to the second thimble 4, and bundles all yarn turns 6 extending between the first and the second thimble 2, 4 in one compact bundle 30 in a middle section 32 of the cable 1. In this embodiment, the cable cover 28 also covers the yarn turns 6 at the thimbles 2, 4. In this embodiment, the casing 20 is located between the middle section 32 of the cable 1 and thimble 2.

Referring to FIG. 2, the first thimble 2 has a bearing surface 40. In this embodiment, the bearing surface 40 is a cylindrical shaped surface, wherein the centre of the cylindrical shaped surface coincides with the centre 14 of the thimble 2. The first layer of yarn turns 6 lies on the bearing surface 40 of the thimble 2. The bearing surface 40 of the thimble 2 has been pre-treated by manually polishing the surface to a surface roughness RA of approximately 0.3 µm. The bearing surface 40 is provided with a friction reducing coating 42, in this embodiment a coating that polytetrafluoroethylene (PTFE, sold under the trade mark Teflon®). In this embodiment, the PTFE coating comprises a resin that ensures adhesion of the coating to the bearing surface, which coating system is sold under the name Cruson 166 by Cruson Coatings B.V. The layer thickness of the coating is 20-30 µm. In this embodiment, the second thimble 4 has a bearing surface with the same shape as bearing surface 40, and is also provided with a coating of PTFE. Applying such coatings 42 on a manually polished bearing surface 40 results in an increase of the life span, in terms of the number of load cycles, of the first layer of yarns of approximately three to seven times the life span of a similar layer of yarns on a bearing surface of manually polished steel without a coating. An extra advantage of this and other types of coating is that it prevents corrosion of the bearing surface.

The cable 1 is used in the following manner in an embodiment of the invention, to monitor the cable and determine the residual strength. A user measures whether the second and fourth optical fibres 18, 118 are still conductive to light. To this purpose, the second and fourth optical fibres are permanently connected to the laser lights 26, which in turn are operatively connected to a battery (not shown). It is also possible to provide a switch between the battery and the laser lights 26, or to connect a battery to the laser lights each time the measurement is performed. If the second and fourth optical fibres 18, 118 are conductive to light, then light will emit from the respective ends 24 in the casing 30, which will be observed by the user. If both ends 24 emit light, then it is known that the cable 1 has at least a certain residual strength.

The measurement will be repeated after a predetermined amount of time. The length of the predetermined amount of time depends on the design and use of the cable, and may be displayed as a graph or table in a service manual. If, for instance, the design life span is three years, then the predetermined amount of time may be one or more months, but less than a year. If the design life span is for instance ten years, or more, then the predetermined amount of time may be one or several years.

If it turns out at the measurement that one of, or both, the second and fourth optical fibre 18, 118 is not conductive anymore, then the user knows that yarn turns 6 that correspond to the height h2 of the second and fourth optical fibre have worn, and that he has to prepare to replace the cable 1 in the near future. Such preparations will typically include ordering a replacement cable.

According to this embodiment of the invention, the user repeatedly monitors whether the first and in this case third optical fibres 8, 108 are still conductive to light in the same manner as described in relation to the second and fourth optical fibres 18, 118. As long as both the first optical fibre 8 and the third optical fibre 108 still emit light at their second ends 24, the cable 1 is still safe to use and the measurement should be repeated after a predetermined amount of time. This predetermined amount of time may be specified in the service manual, and may be the same as, or different from, in particular shorter than, the predetermined amount of time for measuring if the second and fourth optical fibres 18, 118 are still conductive to light. If either the first optical fibre 8 the third optical fibre 108, or both, is no longer conductive to light, the user should stop using the cable within a replacement period. In this embodiment, the replacement period is zero days. In other words, the user should immediately stop using the cable 1 and replace it with a new one.

Several variants are possible within the scope of the attached claims. The features of the above described preferred embodiment may be replaced by any other feature within the scope of the attached claims, such as the features described in the following paragraphs.

Different types of yarns may be used, such as aramid yarns with a weight of 1610 dTex, 6440 dTex, or 4830 dTex, with or without a coating. Instead of using aramid fibres, one could use other types of fibres, such as polyamide fibres, polyester fibres, polypropylene fibres, polyethylene fibres, HMPE fibres, LCAP fibres, or PBO fibres. The cable could even comprise other types of yarns, e.g. yarns made of carbon fibres, a metal, or a natural fibre. Yarns of fibres may consist for 100% of the relevant fibre type, but could also comprise a small portion of an auxiliary material, e.g. a coating on the fibres to protect the fibres against wear and/or environmental influences. As such auxiliary material is only a small portion in weight, and does not contribute to the strength of the cable, the phrase 'yarn consisting of fibres' is considered to include embodiments with such auxiliary materials within the context of this document.

A cable according to the invention may be made of more or less than ten yarns, such as one yarn, two yarns, or at least five yarns. The number of yarn turns depends on the required strength of the cable, and the strength of one individual yarn, as well as the required safety margin. The number of yarn layers in the stack of layers depends on the required number of yarn turns, and the available width in the thimble resulting in a maximum number of yarn turns in the width direction.

Although it is preferred to provide a casing and a permanent laser light, one could also have the ends installed in a casing without permanent laser light or the loose ends of the conductive fibre exiting the cable and connect a measuring device, in case of an optical fibre a laser light, to one end of the conductive fibre each time the cable is tested.

The conductive fibre can be any fibre capable of carrying a signal. Instead of an optical fibre, another type of conductivity is possible within the scope of the invention, such as an electric conductive fibre, for example a carbon fibre or an electrical conductive metal fibre.

The most important location to monitor the wear is the area where the yarn turns first reach the thimble and start turning around the thimble. It would suffice within the scope of the invention to just provide a conductive fibre there, or conductive fibres at the respective entering/exit points of the yarn turns at each thimble.

In a simple embodiment, there may be one conductive fibre at one first predetermined height to signal just when the cable needs to be replaced immediately, or at a known moment in the near future. Alternatively one can have multiple conductive fibres at this first predetermined height for this purpose. In particular, the one or more conductive fibres at the first predetermined height may be there to signal when it is time to order a new cable. The user may continue to use the cable for a certain period of time when one or more of these conductive fibres are not conductive anymore, which certain period of time depends on the use, actual time to the moment that the conductive fibre was not conductive anymore, and predicted life span of the cable. This may be displayed in a graph and/or table in the service manual.

The number of conductive fibres at the first predetermined height may be one, or two, or more than two. The number of conductive fibres at the second predetermined height may be zero, one, two, or more than two. The number of conductive fibres at the first and second predetermined height may be the same, or different. At one height, there may be one conductive fibre, while at the other height there may be multiple conductive fibres, e.g. two, three, four or more.

In an embodiment there may be conductive fibres at more than one or two predetermined heights, in particular at three or more predetermined heights. This increases the insight in the wear and remaining life span of the cable.

A service manual showing the predetermined periods of time, and remaining life spans, may be a paper manual or a digital manual which latter may be an off-line program on a computer, or smartphone, or other suitable digital device of a user or the supplier of the cable, and/or an on-line application on a web page.

The replacement period may be more than zero days, and depends on the design and life span of the cable, as well as the time that it took from the moment the cable came into use to the conductive fibre's failure. The replacement period may be specified in the service manual. This is in particular useful if the cable only comprises one or more conductive fibres at one height. In such an embodiment, there is no pre-warning indicating that a new cable should be ordered. It is advantageous in such an embodiment to position the conductive fibre at a predetermined height, corresponding to the wear of a portion of yarn turns that is still well within a safety limit.

Instead of inputting light at one end of an optical fibre, and observing whether light comes out at another end, one could also input light and observe at the same end. This can be advantageous when the cable is relatively long, such as cables used for the mooring of floating offshore structures. In such an embodiment, the optical fibre is provided with a mirror for reflecting light beyond at least one thimble. Preferably, such a mirror is a distributed Bragg reflector, such as a fibre Bragg grating. If no light is reflected by the distributed Bragg reflector, the optical fibre is broken between the end where the light is inputted and measured and the distributed Bragg reflector.

In a further embodiment, the measuring of the conductive fibre is done in an automated fashion. A source of power, such as a battery or a solar panel, is provided, as well as an electronic control circuit that comprises a wired or wireless transmitter, such as a WiFi transmitter or a Bluetooth transmitter, and an optical eye. The control circuit provides an electric pulse, which is transformed into light by a laser in the case of an optical fibre. The control circuit determines whether the conductive fibre is still conductive, by measuring whether light, or electric current in the case of an electric conductive fibre, comes out at the other end of the conductive fibre and activates the optical eye. The result of the measurement is transmitted to an external computer via the transmitter. The control circuit may comprise a timer for performing the measurement at predetermined time intervals, or may perform the measurement on request via the external computer.

The thimble may be made of a plastic instead of a metal, or of a different metal than stainless steel, including but not limited to different steel alloys, aluminium alloys, magnesium alloys, and titanium.

The bearing surface may have one of several shapes, such as part of a cylinder, part of an ellipsoid, or another curved surface. The coating may comprise another fluoropolymer, such as a poly(perfluoroalkoxy alkane) (PFA), poly(fluorinated ethylene-propylene) (FEP), polyvinylidene fluoride (PVDF), polyethylenechlorotrifluoroethylene (ECTFE), and/or polyethylenetetrafluoroethylene (ETFE). In a variant the coating comprises micro chrome plating, tungsten disulphide (such as sold under the trade mark Dicronite® by Lubrication Sciences International), BAM (aluminium magnesium boride), ceramic coating, titanium nitride (TiN), and/or diamond-like carbon (DLC). Several bonding methods between the thimble and the coating are possible, depending on the type of coating and the material and pre-treatment of the bearing surface, including using primers, adhesives and using form fit. Instead of both, the bearing surface of just one thimble may have a friction reducing coating.

Instead of manually polishing the bearing surface, one may apply electropolishing to the bearing surface, which results in an even smoother surface.

It is possible to have a cable with both a friction reducing coating and a conductive fibre, as in the preferred embodiment, but it is also advantageous to have a thimble without a friction reducing coating and just a conductive fibre as claimed. In an alternative embodiment, a cable has a thimble with a friction reducing coating and the cable does not comprise a conductive fibre.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

The invention claimed is:

1. A cable (1), comprising:
a first thimble (2) and a second thimble (4), at least one yarn (6), and at least a first conductive fibre (8) for monitoring the cable (1), wherein
the first thimble (2) and the second thimble (4) are provided at opposite ends of the cable (1),
the at least one yarn (6) extends from the first thimble (2) to the second thimble (4), turns around the second thimble (4), extends from the second thimble (4) to the first thimble (2), and turns around the first thimble (2), such that
the at least one yarn (6) forms a turn around the first and second thimbles (2, 4), and
each thimble (2, 4) holds a stack (9) of layers (10) of turns of the at least one yarn (6), wherein an inside of the stack (12) is defined as a side of a first layer of turns of the at least one yarn (6) being closest to a centre (14) of the respective thimble, an outside of the stack (16) is defined as a side of a last layer of turns of the at least one yarn (6) being farthest away of the centre (14) of the respective thimble, and a stack height (h) is defined as the distance from the inside of the stack (12) to the outside of the stack (16), wherein,
the first conductive fibre (8) is different from the at least one yarn and designed to signal the wear of the at least one yarn (6) by breaking after a predetermined portion of the turns of the at least one yarn (6) breaks,
the first conductive fibre (8) is positioned in the stack (9) of layers (10) of the first thimble (2) between the turns of the at least one yarn (6) at a first, predetermined height (h1) of the stack measured from the inside of the stack (12), and
the first predetermined height (h1) is less than 50% of the stack height (h).

2. The cable according to claim 1, wherein the first conductive fibre (8) is in direct contact with some of the turns of the at least one yarn (6).

3. A cable according to claim 1, wherein a second conductive fibre (18) is positioned in the stack (9) of layers (10) of the first thimble (2) between the turns of the at least one yarn (6) at a second predetermined height (h2) of the stack (9), wherein the second predetermined height (h2) of the stack (9) is different from the first predetermined height (h1) of the stack (9).

4. The cable according to claim 3, wherein the second predetermined height (h2) of the stack (9) is less than the first predetermined height (h1) of the stack (9).

5. The cable (1) according to claim 1, wherein the first conductive fibre (8) extends at least from the first thimble (2) to the second thimble (4), and is positioned in the stack (9) of layers (10) of the second thimble (4) between the turns of the at least one yarn (6) at approximately the same first predetermined height (h1) of the stack (9) measured from the inside of the stack as at the first thimble (2).

6. The cable (1) according to claim 1, further comprising a casing (20), wherein both ends (22, 24) of the first conductive fibre (8) are located in the casing (20).

7. The cable (1) according to claim 1, wherein the first conductive fibre (8, 18) is an optical fibre.

8. The cable (1) according to claim 7, wherein a light source is operatively connected to one of the ends of the first optical fibre.

9. The cable (1) according to claim 8, further comprising a casing (20), wherein the light source is provided in the casing (20).

10. The cable (1) according to claim 1, further comprising a cable cover (28) which extends around the cable (1) from the first thimble (2) to the second thimble (4), and bundles all turns of the at least one yarn (6) extending between the first and the second thimbles (2, 4) in one compact bundle (30) in a middle section (32) of the cable (1).

11. The cable (1) according to claim 10, further comprising a casing (20), and wherein the casing (20) is located between the middle section (32) of the cable (1) and one of the thimbles (2).

12. The cable (1) according to claim 1, wherein the at least one yarn (6) comprises fibres selected from the group consisting of: carbon fibres, plastic fibres, polyamide fibres, polyester fibres, polypropylene fibres, polyethylene fibres, aramid fibres, HMPE fibres, LCAP fibres, and PBO fibres.

13. A method for monitoring a cable, comprising the steps of:
(i) providing a cable (1) said cable (1) comprising:
a first thimble (2) and a second thimble (4), at least one yarn (6), and at least a first conductive fibre (8) for monitoring the cable (1), wherein
the first thimble (2) and the second thimble (4) are provided at opposite ends of the cable (1),
the at least one yarn (6) extends from the first thimble (2) to the second thimble (4), turns around the second thimble (4), extends from the second thimble (4) to the first thimble (2), and turns around the first thimble (2), such that
the at least one yarn (6) forms a turn around the first and second thimbles (2, 4), and
each thimble (2, 4) holds a stack (9) of layers (10) of turns of the at least one yarn (6), wherein an inside of the stack (12) is defined as a side of a first layer of turns of the at least one yarn (6) being closest to a centre (14) of the respective thimble, an outside of the stack (16) is defined as a side of a last layer of turns of the at least one yarn (6) being farthest away of the centre (14) of the respective thimble, and a stack height (h) is defined as the distance from the inside of the stack (12) to the outside of the stack (16), wherein, the first conductive fibre (8) is different from the at least one yarn and designed to signal the wear of the at least one yarn (6) by breaking after a predetermined portion of the turns of the at least one yarn (6) breaks,
the first conductive fibre (8) is positioned in the stack (9) of layers (10) of the first thimble (2) between the turns of the at least one yarn (6) at a first predetermined height (h1) of the stack measured from the inside of the stack (12), and
the first predetermined height (h1) is less than 50% of the stack height (h);
(ii) measuring whether the first conductive fibre (8) is still conductive;
(iii) if the first conductive fibre (8) is conductive, repeating the measuring after a predetermined amount of time; and
(iv) if the first conductive fibre (8) is not conductive anymore, stop using the cable within a replacement period or immediately.

14. The method according to claim 13, wherein the cable (1) comprises a second conductive fibre (18) which is provided in the stack (9) of layers (10) of the first thimble (2) between the turns of the at least one yarn (6) at a second predetermined height of the stack (h2), and the second predetermined height (h2) of the stack is less than the first predetermined height (h1) of the stack, and the method further comprises the steps of:
(v) measuring whether the second conductive fibre (18) is still conductive;
(vi) if the second conductive fibre (18) is conductive, repeating the measuring after a predetermined amount of time; and
(vii) if the second conductive fibre (18) is not conductive anymore, preparing to replace the cable (1) in the future.

15. The cable according to claim 1, comprising a second conductive fibre (108), wherein the first and second conductive fibres (8, 108) are positioned in the stack (9) of layers (10) of the first thimble (2) between the turns of the at least one yarn (6) at the first predetermined height (h1), spaced apart from each other in a width direction of the first thimble (2).

16. The method according to claim 13, wherein the cable (1) comprises a second conductive fibre (108), and the first and second conductive fibres (8, 108) are positioned in the stack (9) of layers (10) of the first thimble (2) between the turns of the at least one yarn (6) at the first predetermined height (h1), spaced apart from each other in a width direction of the first thimble (2), and the method further comprises the steps of
(v) measuring whether the first and second conductive fibres (8, 108) are still conductive,
(vi) if the first and second conductive fibres (8, 108) are both conductive, repeating the measuring after a predetermined amount of time, and
(vii) if either one or both of the first and second conductive fibres (8, 108) is not conductive anymore, stop using the cable within a replacement period or immediately.

* * * * *